United States Patent [19]

Hyner et al.

[11] 4,216,032

[45] Aug. 5, 1980

[54] OIL COMPOSITION AND METHOD FOR TREATING PHOSPHATED METAL SURFACES

[76] Inventors: Jacob Hyner, 58 Moran St., Waterbury, Conn. 06704; Jacob M. Hage, 29523 Ravenscroft, Farmington, Mich. 48018; Stephen Gradowski, 39 Jardon St., Torrington, Conn. 06790

[21] Appl. No.: 946,460

[22] Filed: Sep. 27, 1978

[51] Int. Cl.$^2$ .................. C23F 7/10; C23F 11/14; C23F 11/18

[52] U.S. Cl. .................. 148/6.15 Z; 106/14.33; 106/14.24; 106/14.25; 148/6.15 R; 252/26; 252/389 R; 422/7

[58] Field of Search .............. 252/389 R, 312, 26; 106/14.32, 14.33, 14.24, 14.25; 148/6.15 R, 6.15 Z; 422/7

[56] References Cited

U.S. PATENT DOCUMENTS

| | | | |
|---|---|---|---|
| 2,346,157 | 4/1944 | Farrington et al. | 252/395 |
| 3,741,834 | 6/1973 | Williams et al. | 252/395 |
| 3,775,319 | 11/1973 | Hartman | 252/389 R |
| 3,948,686 | 4/1976 | Lochner et al. | 148/6.15 Z |

*Primary Examiner*—Benjamin R. Padgett
*Assistant Examiner*—Irwin Gluck
*Attorney, Agent, or Firm*—DeLio and Montgomery

[57] ABSTRACT

Superior corrosion resistance is provided by an improved oil composition an aqueous emulsified phosphating oil, an effective amount of polyvinylpyrrolidone and metallic zinc powder dispersed therein, which is applied, preferably by immersion or spraying, to a phosphated metal surface.

8 Claims, No Drawings

OIL COMPOSITION AND METHOD FOR TREATING PHOSPHATED METAL SURFACES

BACKGROUND OF THE INVENTION

The present invention pertains to the treatment of metal surfaces in order to improve the corrosion resistance thereof. More specifically, the invention provides a novel and improved emulsified oil composition, usually referred to as a "phosphating oil", and method of treating phosphated metal surfaces therewith.

In the field of metal surface treatment, it is of considerable importance to provide metal surfaces with the maximum degree of resistance against corrosion. Otherwise, corrosion can readily attack either ferrous or non-ferrous metals, which are routinely exposed to corrosive agents and environments. For example, corrosion can result from the presence of water and oxygen causing the formation of rust on ferrous metal surfaces, or from oxidation or formation of metallic residues on non-ferrous metal surfaces.

One known way to inhibit corrosion has been to subject metallic surfaces to a "phosphating" treatment. For purposes of the present invention, the terms "phosphating" or "phosphated" refer to treatment by which a metal surface is rendered relatively inactive to attack by corrosive agents by formation or deposition thereupon of adherent crystalline deposits of phosphate salts. Typically, a phosphating treatment involves immersion of the metal surface in a hot aqueous solution containing phosphoric acid and/or phosphate salts, as well as one or more other organic salts, such as zinc nitrate, calcium nitrate, copper sulphate, etc. As a consequence, the solution acts chemically on the metallic surface, so that the desired crystalline phosphate deposit forms and adheres thereupon. This provides an initial passivation of the metal surface against attack by corrosive agents or environments and is a technique which is well known and used commercially in the art.

It is also known that the degree of corrosion resistance provided by phosphated metal surfaces can be enhanced by application of an oil composition which adheres to the phosphated surface and further prevents penetration of water, oxygen or other corrosive agents. Typically such an oil composition, commonly referred to as a "phosphating oil", comprises an aqueous emulsion of an oil composition, which may contain stabilizers, emulsifying agents and extenders and other additives.

However, even phosphated metal surfaces to which a phosphating oil has been applied provide insufficient corrosion resistance for certain environments and applications. In accordance with the present invention, a novel and improved phosphating oil composition has been developed which can provide in excess of a 100% increase in the degree of corrosion resistance of the phosphated metallic surface to which it is applied. Thus, the present invention constitutes a substantial and beneficial improvement over prior art techniques, compositions and methods.

Accordingly, the primary object of this invention is to provide an improved phosphating oil composition which yields substantially improved and superior corrosion resistance in comparison with conventional phosphating oil compositions.

It is a further object of the invention to provide a novel bath and method for treating phosphated metal surfaces, so as to impart superior corrosion resistance properties thereto.

It is yet a further object of the invention to provide additives for conventional phosphating oil compositions which improve the corrosion resistance properties thereof in applications over phosphated metal surfaces.

SUMMARY OF THE INVENTION

The invention provides a novel and improved aqueous emulsion or nonaqueous solution of oil used for treatment of phosphated metal or metallic surfaces to improve corrosion resistance. This improved aqueous emulsion or nonaqueous solution of oil comprises an aqueous emulsified or nonaqueous solution of oil containing an effective amount of polyvinylpyrrolidone and dispersed metallic zinc powder.

Also, in accordance with the invention, a novel method for providing superior corrosion resistance properties to a phosphated metal surface is provided comprising application, preferably by immersion or spraying, of the improved aqueous emulsion or nonaqueous solution of oil of the invention.

DESCRIPTION OF THE PREFERRED EMBODIMENTS

In accordance with the invention, it has been discovered that the corrosion resistance provided by a conventional phosphating oil can be substantially improved by addition of an effective amount of polyvinylpyrrolidone and dispersed metallic zinc powder in a conventional phosphating oil.

For purposes of the invention, polyvinylpyrrolidone polymers of any available molecular weight are effective and can be utilized. Preferably, however, polyvinylpyrrolidone polymers having an average molecular weight of between 10,000 to 360,000 are utilized. Amounts of polyvinylpyrrolidone ranging from about 1 to 60 grams per liter have been found to be particularly effective in accordance with the present invention.

Likewise, in accordance with the invention it has been found that fine particulate zinc metal, generally referred to as "zinc dust", can be beneficially used in combination with polyvinylpyrrolidone and will contribute to a substantial improvement in the degree of corrosion resistance available from phosphating oil compositions containing the same. While not being limited by any theory, it is nevertheless believed that the zinc dust contributes to the improvement in corrosion resistance of the improved phosphating oil composition of the invention, because it is able to accumulate or be deposited in micro-pores formed in the crystalline matrix of the phosphate coating on the phosphated metal surface. It has been found that, preferably, an amount of zinc dust ranging from 1 to 100 grams per liter is effective for purposes of the invention. Preferably, zinc dust ranging from about 0.5 to 25 microns in size is utilized, although larger or smaller sizes are also operable.

Effective amounts of polyvinylpyrrolidone and zinc dust may be added to any conventional phosphating oil composition, such as Rustarest ®53253, sold by R. O. Hull and Company of Cleveland, Ohio. It is fully within the purview of this invention that any conventional phosphating oil composition may be utilized, without limitation. Such phosphating oils primarily comprise an aqueous emulsion or nonaqueous solution of oil containing a substantial amount of either mineral oil, vegetable oil, animal oil, synthetic oil or any combination thereof, together with optional emulsifiers, stabilizers, extenders, other corrosion resistant additives or the like.

In accordance with the invention, the improved aqueous emulsion or nonaqueous solution of phosphating oil comprises a substantial portion of a conventional phosphating oil, preferably of the aqueous emulsified-type, and an effective amount of polyvinylpyrrolidone and zinc powder. Preferably, the conventional phosphating oil is provided in a range of between about 1 to 40% by volume. The preferred effective amounts of polyvinylpyrrolidone range from about 1 to 60 grams per liter and zinc powder range between about 1 to 100 grams per liter.

The improved phosphating composition of the invention is applied to a phosphated metal surface utilizing any conventional application technique. However, immersion or spraying are preferred. It is also preferable to maintain the temperature of the improved composition of the invention between about 75°–160° F. during application. Above this temperature range, difficulties may be encountered with maintaining the emulsification of the oil composition.

EXAMPLE

A 1 liter solution of the improved aqueous emulsified oil composition was prepared by diluting 20% by volume of a conventional phosphating oil, Restarest ®53253 supplied by R. O. Hull and Company, Inc., Cleveland, Ohio, with water. To this solution was added 20 grams of polyvinylpyrrolidone, having an average molecular weight of about 40,000, and 20 grams of zinc dust. The composition was mixed thoroughly, so as to uniformly disperse the zinc powder and maintain its dispersion in the phosphating oil composition.

A steel fastener, having previously been phosphated by application of Irco Bond ®51800 Phosphating Concentrate, also supplied by R. O. Hull and Company, Inc., was immersed in the improved composition of the invention for a period of 30 seconds, while the composition was maintained at a temperature of 140° F. Following immersion of the steel fastener, it was allowed to drain and dry, and thereafter was subjected to the standard 72 hour neutral salt spray test, ASTM B-117.

For purposes of comparison, an identical phosphated steel fastener was similarly treated with the same phosphated oil (Rustarest ®53253), but without the polyvinylpyrrolidone and zinc dust additives of the invention. Likewise, following drying, this fastener was subjected to the same salt spray test and was found to endure 90 hours before failure. By comparison, the phosphatized steel fastener treated with the improved composition of the invention indured 180 hours of exposure before failure in the salt spray test. This represents a 100% improvement in corrosion resistance in accordance with the invention.

The above Example is given solely for purposes of illustration, it being understood that such composition and method of application and improvement of corrosion resistance on a phosphatized metal substrate may be altered, varied or modified without departing from the spirit or scope of the invention as defined by the appended claims.

What is claimed is:

1. In an improved aqueous emulsion or nonaqueous solution of oil for treatment of phosphated metal surfaces to improve corrosion resistance, the improvement comprising an effective amount of polyvinylpyrrolidone and dispersed metallic zinc powder.

2. The improved composition of claim 1, wherein said effective amount of polyvinylpyrrolidone ranges between 1 to 60 grams per liter and said dispersed zinc powder ranges from 1 to 100 grams per liter.

3. An improved composition of claim 1, wherein
   (a) said aqueous emulsion or nonaqueous solution of oil ranges between 1 to 40 by volume;
   (b) said polyvinylpyrrolidone ranges between 1 to 60 grams per liter; and
   (c) said zinc powder ranges between 1 to 100 grams per liter.

4. The improved composition of claim 3, wherein said aqueous emulsion or nonaqueous solution of oil comprises an oil selected from the group consisting of mineral oils, vegetable oils, animal oils, synthetic oils and any combination thereof, together with suitable emulsifiers, stabilizers, extenders, corrosion resistant additives or like additives.

5. The improved composition of claim 3, wherein said bath is applied by immersion of said phosphated metal surface therein or by spraying said bath upon said surface.

6. An improved method for providing superior corrosion resistance to a phosphated metal surface comprising application of the improved composition of claim 1 to said phosphated metal surface.

7. The improved method of claim 6, wherein said bath is applied by immersion or spraying.

8. The improved method of claim 6, wherein the temperature of said composition is maintained at between 75°–160° F. during said application.

* * * * *